(12) United States Patent
Lee et al.

(10) Patent No.: US 11,114,080 B2
(45) Date of Patent: Sep. 7, 2021

(54) DUCT SOUND ABSORBER

(71) Applicant: Toyota Motor Engineering & Manufacturing North America, Inc., Plano, TX (US)

(72) Inventors: Taehwa Lee, Ann Arbor, MI (US); Hideo Iizuka, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 539 days.

(21) Appl. No.: 16/113,208

(22) Filed: Aug. 27, 2018

(65) Prior Publication Data
US 2020/0066245 A1    Feb. 27, 2020

(51) Int. Cl.
*G10K 11/172* (2006.01)
*G10K 11/162* (2006.01)

(52) U.S. Cl.
CPC .......... *G10K 11/172* (2013.01); *G10K 11/162* (2013.01)

(58) Field of Classification Search
CPC .............................. G10K 11/162; G10K 11/172
USPC .......................................................... 181/224
See application file for complete search history.

(56) References Cited

U.S. PATENT DOCUMENTS

| | | | | |
|---|---|---|---|---|
| 4,371,054 A * | 2/1983 | Wirt | ........................ | F01D 25/30 181/252 |
| 4,645,032 A * | 2/1987 | Ross | ........................ | F02C 7/24 181/224 |
| 6,609,489 B1 * | 8/2003 | Slopsema | .......... | F02M 35/1261 123/184.57 |
| 7,077,093 B2 * | 7/2006 | Koelmel | .............. | F02B 27/021 123/184.57 |
| 10,546,070 B2 * | 1/2020 | Hellat | .................. | F23M 20/005 |
| 2001/0009207 A1 * | 7/2001 | Faulhaber | ............. | F16L 55/033 181/224 |
| 2010/0212999 A1 * | 8/2010 | Marion | ................ | G10K 11/172 181/250 |
| 2016/0365079 A1 * | 12/2016 | Scherrer | ................... | E04B 1/84 |

(Continued)

FOREIGN PATENT DOCUMENTS

CA        2888744 C  *  7/2016  ............. F02K 1/822

OTHER PUBLICATIONS

Wang et al., "Wave propagation in a duct with a periodic Helmholtz resonators array," J. Acous. Soc. Am. 131 (2), pp. 1172-1182 (2012).

(Continued)

*Primary Examiner* — Forrest M Phillips
(74) *Attorney, Agent, or Firm* — Christopher G. Darrow; Darrow Mustafa PC (57) ABSTRACT

Sound absorption units for fluid ducts include two acoustically coupled pairs of Helmholtz resonators. The two resonators within each pair have identical resonance frequency, however the upstream resonator within each pair is partly filled with an acoustically lossy porous material, so that the upstream resonator within each pair has greater acoustic loss than its coupled downstream resonator. The upstream pair of resonators has a relatively low resonance frequency, while the downstream pair of resonators has a relatively high resonance frequency. The combination of frequency mismatch between the resonator pairs, and loss mismatch within each resonator pair, produces consistently high sound absorption across a broad frequency spectrum.

19 Claims, 6 Drawing Sheets

(56) References Cited

U.S. PATENT DOCUMENTS

2019/0249580 A1* 8/2019 Nguyen Hung ........ F01N 1/023
2019/0266990 A1* 8/2019 Semperlotti ......... G10K 11/172

OTHER PUBLICATIONS

Shirvanimoghaddam et al., "Carbon fiber reinforced metal matrix composites: Fabrication processes and properties," Composites: Part A 92, pp. 70-96 (2017).
Selamet et al., "Helmholtz resonator lined with absorbing material;" J. Acoust. Soc. Am. 117 (2), pp. 725-733 (2005).
Merkel et al., "Control of acoustic absorption in one-dimensional scattering by resonant scatters," Appl. Phys. Lett. 107, 244102, 4 pages (2015).
Long et al., "Asymmetric absorber with multiband and broadband for low-frequency sound," Appl. Phys. Lett 111, 143502, 5 pages (2017).

* cited by examiner

DUCT SOUND ABSORBER

TECHNICAL FIELD

The present disclosure generally relates to acoustic metamaterials and, more particularly, to acoustic metamaterials that absorb airborne sound.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Ducts for conveying fluids are widely used for air conditioning and ventilation in vehicles and houses. However, noise is also carried through these ducts, requiring effective sound reduction for a more pleasant driving and living environment. Conventional approaches for noise reduction in ducts include the use of quieter fluid flow drive devices, such as fans or pumps; silencers; and sound insulation. The degree of noise attenuation achievable with these approaches can be limited, and in the case of sound insulation can require prohibitively thick layers in order to accomplish a desirable degree of attenuation.

Acoustically resonant structures, such as Helmholtz resonators, can be deployed in various contexts to absorb sound. However, efficient absorption is generally narrowly limited around a resonance frequency of the resonator(s). Coupled resonators of different resonance frequency have been used to broaden the frequency range of efficient absorption, however this approach fails to provide sufficient frequency bandwidth for many applications.

Accordingly, it would be desirable to provide an improved acoustic absorption system for ducts having highly efficient sound absorption across a broad frequency range.

SUMMARY

This section provides a general summary of the disclosure, and is not a comprehensive disclosure of its full scope or all of its features.

In various aspects, the present teachings provide a fluid duct sound absorption system. The system includes a duct having at least one side wall for directing flow of a fluid and having a longitudinal axis defining upstream and downstream directions. The system further includes a low frequency (LF) coupled pair of Helmholtz resonators comprising an upstream LF Helmholtz resonator and a downstream LF Helmholtz resonator separated by a first coupling distance. Each of the upstream and downstream LF Helmholtz resonators includes a LF chamber portion bounded by at least one enclosure wall defining a LF chamber volume; and a LF neck connecting an aperture in the at least one enclosure wall to an aperture in the at least one side wall and thereby placing the LF chamber portion in fluid communication with the duct. The system further includes a high frequency (HF) coupled pair of Helmholtz resonators positioned downstream from the LF coupled pair of Helmholtz resonators, and comprising an upstream HF Helmholtz resonator and a downstream HF Helmholtz resonator separated by a second coupling distance. Each of the upstream and downstream HF Helmholtz resonators includes a HF chamber portion bounded by at least one enclosure wall defining a HF chamber volume; and a HF neck connecting an aperture in the at least one enclosure wall to an aperture in the at least one side wall and thereby placing the HF chamber portion in fluid communication with the fluid duct. The upstream LF neck and the upstream HF neck is covered and at least partially filled with an acoustically absorbing medium.

In other aspects, the present teachings provide a fluid duct sound absorption system. The system includes a duct having at least one side wall for directing flow of a fluid and having a longitudinal axis defining upstream and downstream directions. The system further includes a low frequency (LF) coupled pair of Helmholtz resonators comprising an upstream LF Helmholtz resonator and a downstream LF Helmholtz resonator positioned on the duct and separated by a first coupling distance. Each of the upstream and downstream LF Helmholtz resonators has a first resonance frequency. The system further includes a high frequency (HF) coupled pair of Helmholtz resonators positioned downstream from the LF coupled pair of Helmholtz resonators comprising an upstream HF Helmholtz resonator and a downstream HF Helmholtz resonator positioned on the duct and separated by a second coupling distance. Each of the upstream and downstream HF Helmholtz resonators has a second resonance frequency that is greater than the first resonance frequency. The system further includes an internal sound reflector formed of a planar acoustically reflective material positioned inside the duct to reflect sound waves emanating from any of the Helmholtz resonators back to the same Helmholtz resonator. The upstream LF Helmholtz resonator and the upstream HF Helmholtz resonator are covered and at least partially filled with an acoustically absorbing medium.

In still other aspects, the present teachings provide an air duct for a motor vehicle. The air duct includes at least one side wall for directing air flow and having a longitudinal axis defining upstream and downstream directions. The air duct further includes a low frequency (LF) coupled pair of Helmholtz resonators comprising an upstream LF Helmholtz resonator and a downstream LF Helmholtz resonator separated by a first coupling distance. Each of the upstream and downstream LF Helmholtz resonators includes a LF chamber portion bounded by at least one enclosure wall defining a LF chamber volume; and a LF neck connecting an aperture in the at least one enclosure wall to an aperture in the at least one side wall and thereby placing the LF chamber portion in fluid communication with the duct. The system further includes a high frequency (HF) coupled pair of Helmholtz resonators positioned downstream from the LF coupled pair of Helmholtz resonators, and comprising an upstream HF Helmholtz resonator and a downstream HF Helmholtz resonator separated by a second coupling distance. Each of the upstream and downstream HF Helmholtz resonators includes a HF chamber portion bounded by at least one enclosure wall defining a HF chamber volume; and a HF neck connecting an aperture in the at least one enclosure wall to an aperture in the at least one side wall and thereby placing the HF chamber portion in fluid communication with the fluid duct. The upstream LF neck and the upstream HF neck is covered and at least partially filled with an acoustically absorbing medium.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide sound absorption systems to eliminate noise from fluid ducts. The disclosed sound absorption systems can be broadly configured and tuned for different duct types, geometries, and sound frequency ranges.

The sound absorption systems of the present teachings include coupled pairs of Helmholtz resonators attached to, and in fluid communication with, a fluid duct. The configuration of the systems generates broad spectrum sound absorption by providing a resonance frequency difference between the coupled pairs, and an acoustic loss difference between the coupled, individual resonators within each pair.

Figure 1A:
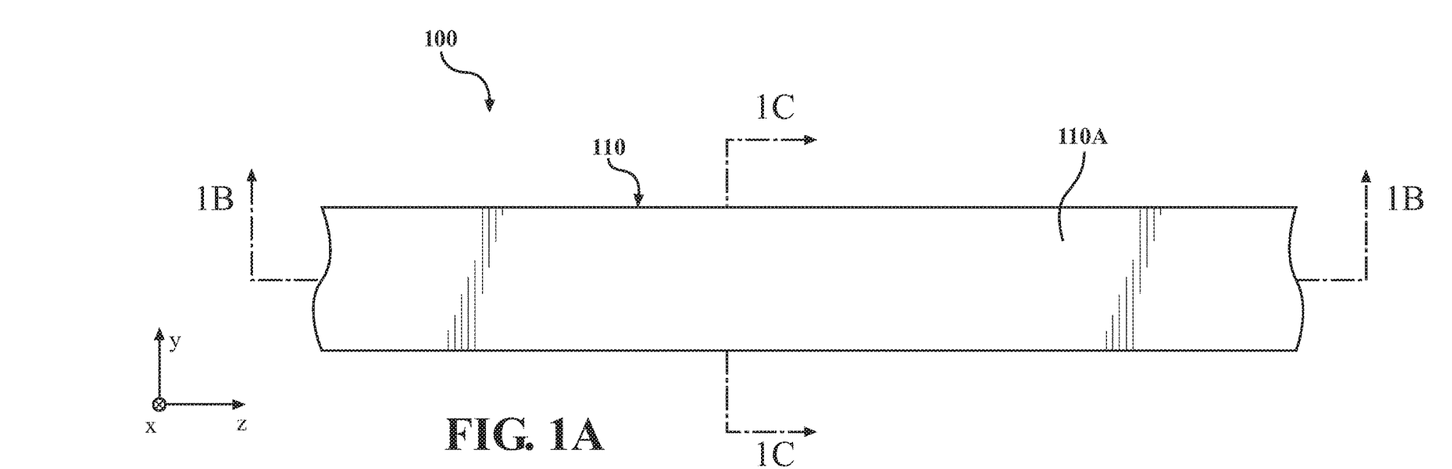
FIG. 1A is a top plan view of a fluid duct having a sound absorption system of the present teachings.

FIG. 1A shows a top plan view of a fluid duct 100 having a sound absorption system of the present teachings. The fluid duct 100 is formed of at least one side wall 110. The exemplary fluid duct 100 of FIG. 1A can be integrated into any system for directed flow of a fluid. In different manifestations, the fluid duct 100 can be configured to direct flow of air or other gas, such as in an HVAC system in a building or a motor vehicle; or can be configured to direct flow of a liquid, such as in a water main or a hydraulic fluid line. As such, the at least one side wall 110 can be composed of any suitable material, including a metal or a plastic.

Figure 1B:
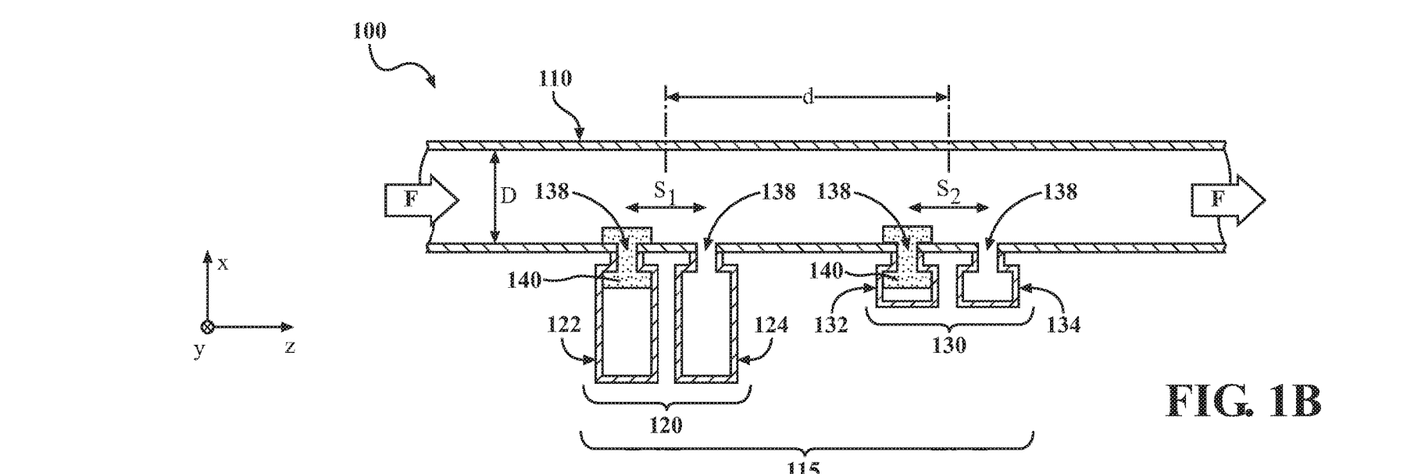
FIG. 1B is a side cross-sectional view of duct of FIG. 1A, viewed along the line 1B-1B.

FIG. 1B shows a side cross-sectional view of the fluid duct 100 along the line 1B-1B of FIG. 1A, and illustrates a sound absorption unit 115 of the sound absorption system. The sound absorption unit 115 is configured to absorb sounds resulting from the flow of fluid. As will become apparent, the geometry of the sound absorption unit 115 can differ for differing duct 100 sizes, and also for different fluids having different speed of sound. A direction of fluid flow is indicated by the block arrows labeled "F", so that the direction of fluid flow is from left-to-right in the view of FIG. 1B. The direction of fluid flow defines relative "upstream" and "downstream" positions in the duct 100 such that, given the direction of fluid flow shown in FIG. 1B, a position nearer to the left end of the duct 100 is upstream of a position nearer to the right end of the duct 100; and a position nearer to the right end of the duct 100 is downstream of a position nearer to the left end of the duct 100, according to the representation of FIG. 1B. If the direction of fluid flow were reversed, the designations of upstream and downstream would similarly be reversed. Analogous to an electrical circuit, positions in the duct 100 that are neither upstream nor downstream of one another can be considered to be "in parallel" with one another. Positions in the duct 100 that are not in parallel with one another, without specifying upstream or downstream, can be considered to be "in series" with one another.

Figure 1C:
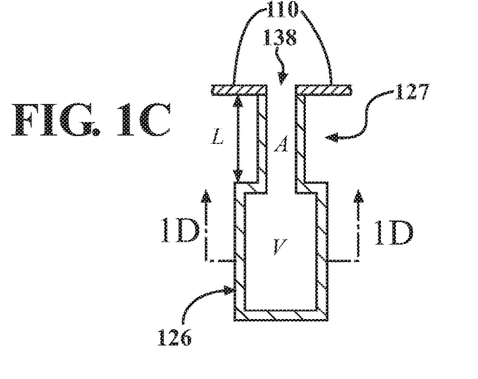
FIG. 1C is a side cross-sectional view of a Helmholtz resonator of the sound absorption system of the duct of FIG. 1A, viewed along the line 1C-1C.

The sound absorption unit 115 includes four Helmholtz resonators 122, 124, 132, and 134. FIG. 1C shows a magnified cross-sectional view of any Helmholtz resonator 122, 124, 132, 134. The illustration of FIG. 1C is intended to show general features of any Helmholtz resonator discussed herein, including any of Helmholtz resonator 122, 124, 132, and 134. The Helmholtz resonator 122, 124, 132, 134 of FIG. 1C includes a chamber portion 135 bounded by at least one enclosure wall 126, defining a chamber volume, V. The at least one enclosure wall 126 can be formed of an acoustically reflective material, such as a metal or hard plastic; and can be but need not necessarily be formed of the same material as is the at least one side wall 110.

Figure 1D:
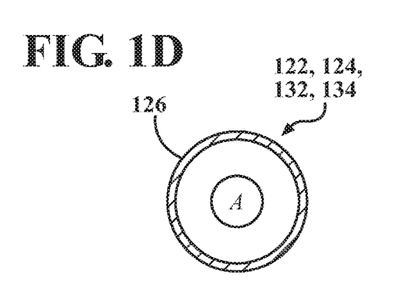
FIG. 1D is a cross-sectional view of the Helmholtz resonator of FIG. 1C, viewed along the line 1D-1D.

FIG. 1D shows a cross-sectional view of the Helmholtz resonator 122, 124, 132, 134 viewed along the line 1D-1D of FIG. 1C. Referring to both FIGS. 1C and 1D, the Helmholtz resonator 122, 124, 132, 134 further includes a neck 136 connecting at an aperture 138 in the at least one side wall 110, and thereby placing the chamber portion in fluid communication with the fluid duct 100. The neck 136 is characterized by a length, L, and a cross-sectional area, A.

Each Helmholtz resonator 122, 124, 132, 134 has a resonance frequency determined by Equation 1:

$$f = \frac{c}{2\pi}\sqrt{\frac{A}{VL}}. \qquad 1$$

where f is the resonance frequency of the Helmholtz resonator; c is the speed of sound in the duct fluid; A is the cross-sectional area of the neck; V is the chamber volume; and L is the neck length.

Referring particularly to FIG. 1B, the sound absorption unit 115 includes a low frequency ($f_L$) coupled pair of Helmholtz resonators 120 (referred to at times hereinafter, for concision, as "the LF pair") that are separated by a first coupling distance, $s_1$. The LF pair 120 includes the Helmholtz resonators 122 and 124, which will be referred to specifically hereinafter as an upstream LF Helmholtz resonator 122 and a downstream LF Helmholtz resonator 124. The upstream and downstream LF Helmholtz resonators 122, 124 have identical dimensions including chamber volume $V_L$, neck length $L_L$, and neck cross-sectional area $A_L$. Therefore, the upstream and downstream LF Helmholtz resonators 122, 124 have identical (relatively low) resonance frequency ($f_L$).

With continued reference to FIG. 1B, the sound absorption unit 115 further includes a high frequency ($f_H$) coupled pair of Helmholtz resonators 130 (referred to at times hereinafter as "the HF pair") that are separated by a second coupling distance, $s_2$. The HF pair 130 includes the Helmholtz resonators 132 and 134, which will be referred to specifically hereinafter as an upstream HF Helmholtz resonator 132 and a downstream HF Helmholtz resonator 134. Like the LF Helmholtz resonators 122, 124, the upstream and downstream HF Helmholtz resonators 132, 134 have identical dimensions including chamber volume $V_H$, neck length $L_H$, and neck cross-sectional area $A_H$ and thus have identical (relatively high) resonance frequency ($f_H$). It will be understood, as shown in FIG. 1B, that the chamber volume of the low frequency Helmholtz resonators 122, 124 is greater than the volume of the high frequency Helmholtz resonators 132, 134 ($V_L > V_H$).

The first coupling distance $s_1$ is substantially dictated by the resonance frequency of the LF Helmholtz resonators 122, 124 in the LF pair 120, as shown in Equation 2:

$$s_1 \cong 0.2\left(\frac{c}{f_L}\right). \qquad 2$$

and similarly, the second coupling distance $s_2$ is substantially dictated by the resonance frequency of the HF Helmholtz resonators 132, 134 in the HF pair 130, as shown in Equation 3:

$$s_2 \cong 0.2\left(\frac{c}{f_H}\right). \qquad 3$$

where $s_1$, $s_2$, c, $f_L$, and $f_H$ are all as defined above.

Figure 1E:
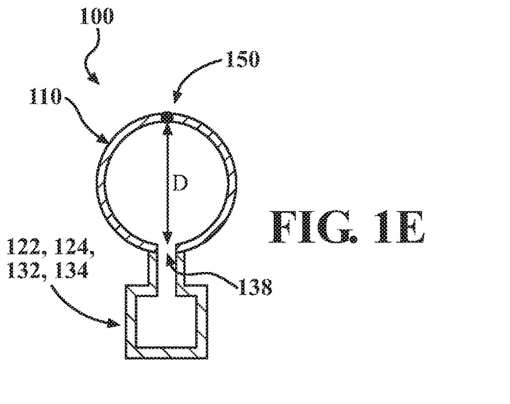
FIG. 1E is cross-sectional view of the duct of FIG. 1A, viewed along the line 1E-1E.
Figure 1F:
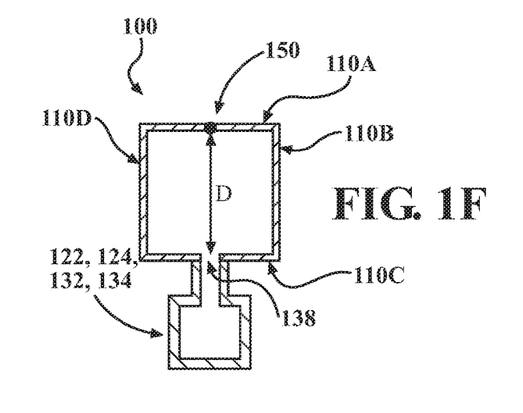
FIG. 1F is cross-sectional view of a duct having an alternative shape and viewed along the same line as in FIG. 1E.

FIG. 1E shows a cross-sectional view of the fluid duct 100, viewed along the line 1E-1E of FIG. 1A. As shown in FIG. 1E, the exemplary fluid duct 100 of FIGS. 1A and 1B has a circular cross-sectional shape, so that the duct 100 is cylindrical. FIG. 1F shows an alternative, square, cross-sectional duct 100 shape, viewed along the same line. The example of FIG. 1F can be considered to have four side walls, 110A, 110B, 110C, and 110D. In different variations, the cross-sectional shape of the duct 100 can be oval, non-square-rectangular, or any other suitable shape.

As shown in FIGS. 1E and 1F, the duct 100 defines a distance, D, between an aperture 138 and an opposing point 150 in the at least one side wall 110. The direction of the distance, D, is perpendicular to an imaginary tangent plane to the side wall 110 at the aperture 138. The distance, D, will be referred to for simplicity as the duct diameter, but it can also be considered as the distance that a sound wave emanating from the aperture 138 will travel before being reflected directly back to the aperture. The duct diameter, D, is limited by a correlation to the resonance frequency, $f_H$, of the HF pair 130 as shown in equation 4:

$$D < 0.5\frac{c}{f_H}. \qquad 4$$

where D, c, and $f_H$ are as defined above. Stated alternatively, the distance a sound wave travels from an aperture 138 to the opposing point 150, and back, should be less than half of the wavelength corresponding to the resonance frequency of a Helmholtz resonator. It will be understood that if this is true for a HF resonator 132, 134, it will automatically be true for a LF resonator 122, 124 as well.

As shown in FIG. 1B, the upstream LF Helmholtz resonator 122 and the upstream HF Helmholtz resonator 132 is each partly filled with an acoustic absorbing medium 140, a "lossy" porous material that attenuates sound through viscous loss and thereby causes the upstream resonator 122, 132 in each resonator pair 120, 130 to have greater acoustic loss than its downstream partner 124, 134. The upstream Helmholtz resonator 122, 132 in each resonator pair 120, 130 can thus alternatively be referred to as the "high loss resonator" 124, 134 within its resonator pair 120, 130. In many implementations, the acoustic absorbing medium 140 can be a viscoelastic foam, such as a melamine foam or polyurethane foam.

In the example of FIG. 1B, and with further reference to FIG. 1C, the acoustic absorbing medium 140 fills the neck 136 of the high loss Helmholtz resonators 122, 132, and also protrudes from the neck 136 into the duct 100 and contiguously fills a portion of the chamber 135. In different variations, the acoustic absorbing medium can fill the neck 136 without protruding into the duct 100 or the chamber 135; or can partially fill the neck 136. In yet other variations, the acoustic absorbing medium 140 can be positioned entirely within the duct 100, overlaying (in the y,z plane of FIG. 1B) the opening to the neck 136. In general, the acoustic absorbing medium 140 can be arrayed in any manner that causes the upstream Helmholtz resonator 122, 132 within each resonator pair 120, 130 to experience greater viscous acoustic loss than does its coupled downstream resonator 124, 134.

With continued reference to FIG. 1B, it will further be observed that the LF resonator pair 120 and the HF resonator pair 130 are separated by an interpair distance of separation, d. This distance is measured from the midpoints of the LF and HF resonator pairs 120. In some implementations, the interpair distance of separation, d, can be defined according to equation 5:

$$d > \frac{(s_1 + s_2 + w_1 + w_2)}{2}. \qquad 5$$

where $s_1$ and $s_2$ are the first and second coupling distances as described above; $w_1$ is the width of the chamber portion 135 of a LF Helmholtz resonator 122, 124; and $w_2$ is the width of the chamber portion 135 of a HF Helmholtz resonator 132, 134. Stated alternatively, the interpair distance of separation can, in many implementations, be greater than the average length, in the z-dimension of FIG. 1B, of the LF and HF resonator pairs 120, 130.

Figure 2A:
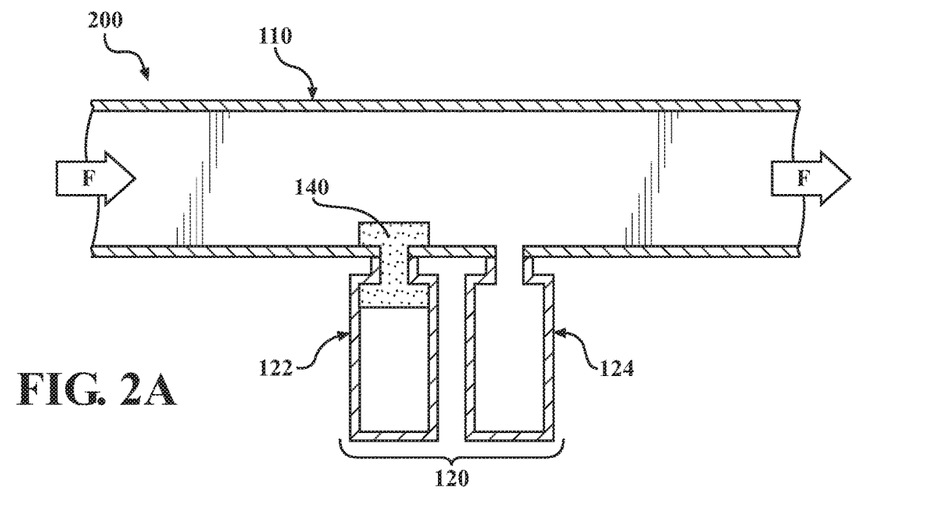
FIG. 2A is a side cross-sectional view of a comparative fluid duct, similar to that of FIG. 1A, but having a sound absorption system with only a first pair of Helmholtz resonators.
Figure 2B:
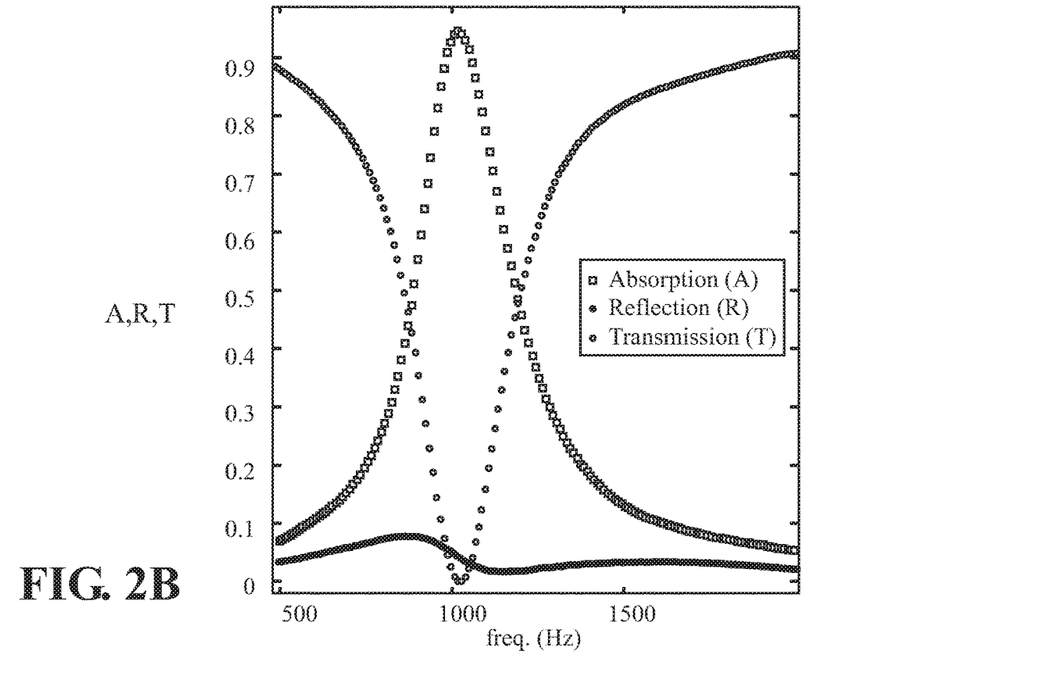
FIG. 2B is a graph of acoustic properties of the duct of FIG. 2A.
Figure 2C:
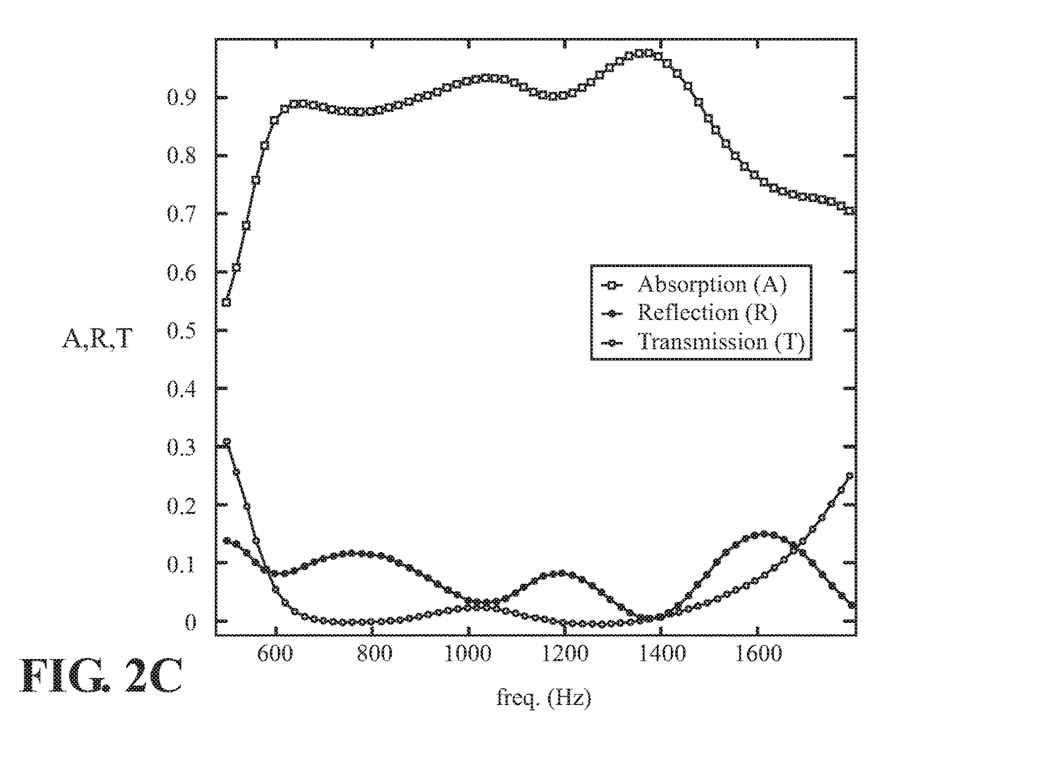
FIG. 2C is a graph of acoustic properties of the duct of FIG. 1A

FIG. 2A shows a comparative duct 200 having only a LF Helmholtz resonator pair 120, and lacking the downstream HF Helmholtz resonator pair 130. FIG. 2B shows calculated acoustic response data for the duct 200 of FIG. 2A, where the LF Helmholtz resonators 122, 124 configured, according to Eq. 2 to have a resonance frequency, $f_H$, just over 1000 Hz. The results indicate a relatively narrow absorption band centered at about 1000 Hz, with greater than 50% sound transmission at frequencies greater than about 1200 Hz and at frequencies less than about 800 Hz, i.e. width at half maximum of about 400 Hz. FIG. 2C shows an equivalent calculation for a duct 100 of the type shown in FIG. 1B, with a sound absorption unit 115 having LF and HF resonator pairs 120, 130. The data in FIG. 2C are determined for a duct 100 having a 20 mm diameter and a 200 mm interpair separation distance, d. The resonance frequency $f_L$ of the LF resonator pair 120 is 600 Hz and the resonance frequency $f_H$ of the HF resonator pair 130 is 1400 Hz. The results show strong sound absorption of over 70% at all frequencies from about 500 Hz to 1800 Hz. These results demonstrate the synergy provided by the frequency mismatch between the Helmholtz resonator pairs 120, 130 in combination with the acoustic loss mismatch between the upstream 122, 132 and downstream 124, 134 resonators within each pair.

Figure 3A:
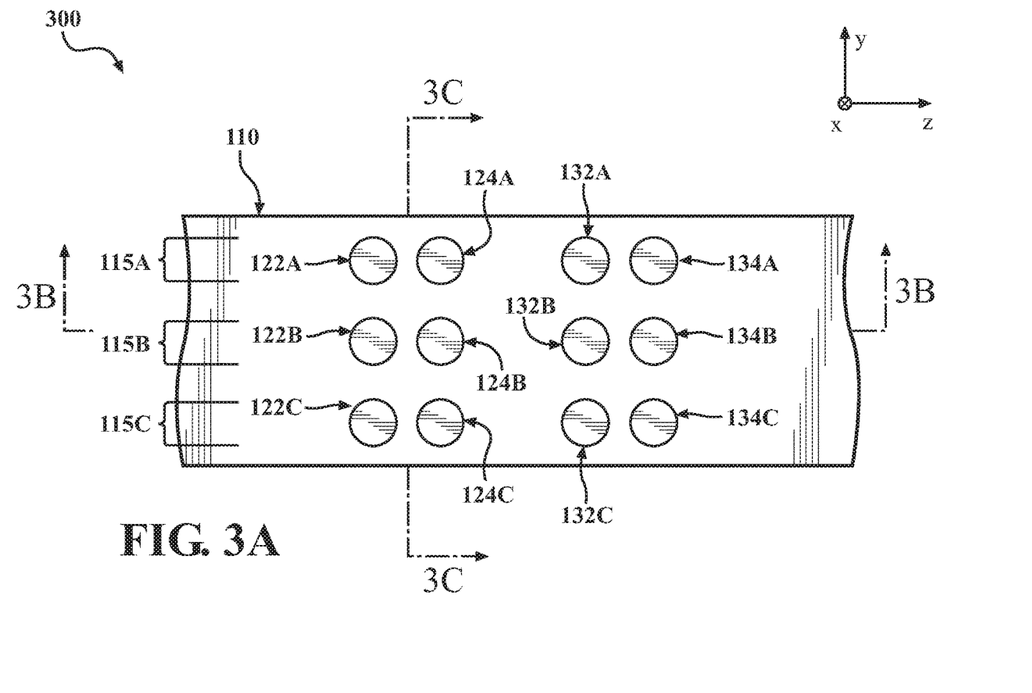
FIG. 3A is a top plan view of an alternative fluid duct having a sound absorption system of the present teachings, illustrating optional variations in Helmholtz resonator number and configuration.
Figure 3B:
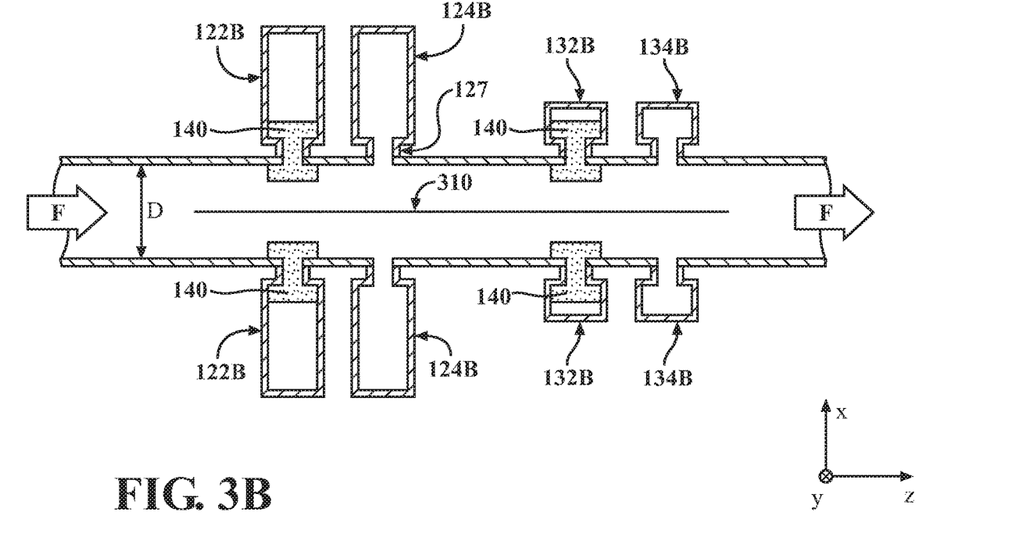
FIG. 3B is a side cross-sectional view of duct of FIG. 3A, viewed along the line 3B-3B.
Figure 3C:
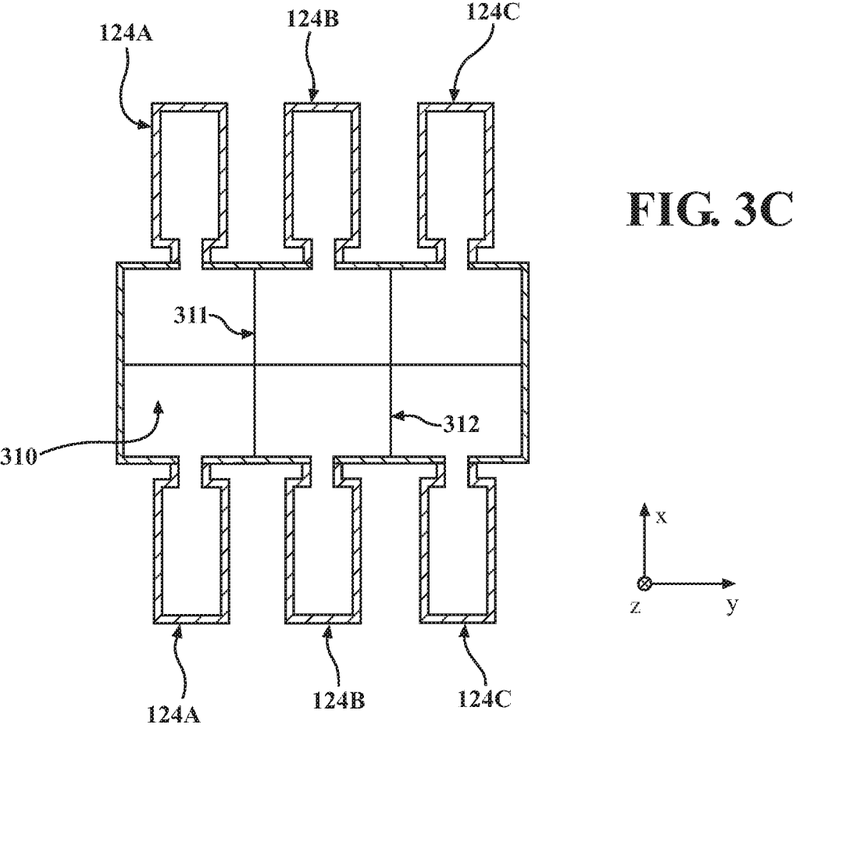
FIG. 3C is cross-sectional view of duct of FIG. 3A, viewed along the line 3C-3C.

FIGS. 3A-3C illustrate configurations of sound absorption units that can be deployed in ducts 300 that are especially wide and/or in which the diameter, D, substantially exceeds the limit imposed by Equation 4. FIG. 3A shows a top plan view of a duct 300 similar to the duct 100 of FIG. 1A, except that the duct 300 of FIG. 3A is substantially wider, occupying a larger distance in the y-dimension. The Helmholtz resonators 122, 124, 132, 134 of FIG. 1A might be unable to provide full sound absorption across the width of the duct 300 of FIG. 3A. Optionally, the individual resonators 122, 124, 132, 134 could be expanded laterally (in the y-dimension) to physically cover most of the width of the wide duct 300 of FIG. 3A. Alternatively, and as illustrated in FIG. 3A, sound absorption units can be placed in parallel (i.e. adjacent to one another in the y-dimension) in order to provide adequate sound absorption across the width of the duct 300. FIG. 3A illustrates an example having three adjacent sound absorption units, 115A, 115B, and 115C placed in parallel with one another, but any number of parallel sound absorption units 115 can be used.

FIG. 3B shows a side cross-sectional view of the duct 300 of FIG. 3A viewed along the line 3B-3B of FIG. 3A. As shown in FIG. 3B, the alternative duct 300 also has a large diameter, D, that exceeds the limit indicated by Equation 4. As described above in connection with Equation 4, the duct diameter, D, should generally be less than one-half the speed of sound in the duct fluid, divided by the resonance frequency, $f_H$, of the HF Helmholtz resonators 132, 134. It would of course be possible to meet this requirement with a large duct by decreasing $f_H$, but such a solution could result in frequency range of sound absorption for the sound absorption unit 115. Alternatively, and as illustrated in FIG. 3B, an internal sound reflector 310 can be employed to acoustically split the duct 300, thereby effectively creating two internal ducts each having duct diameter that is half the true duct diameter. The internal sound reflector 310 is planar in the y-z plane of FIGS. 3A-3C and is formed of any sound reflective material, such as a metal or non-viscous plastic.

FIG. 3C shows a cross-sectional view of the duct 300 of FIG. 3A viewed along the line 3C-3C of FIG. 3A. As shown in the view of FIG. 3C, the duct 300 can include additional internal sound reflectors 311, 312 to create smaller acoustic ducts within the duct 300.

Figure 4A:
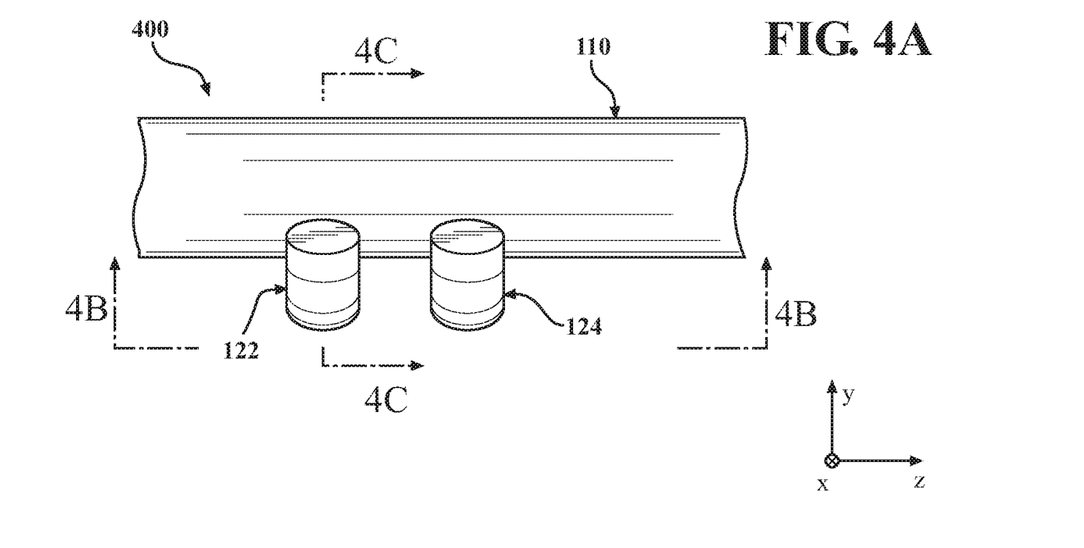
FIG. 4A is a top plan view of an alternative fluid duct having a sound absorption system of the present teachings, illustrating optional variations in Helmholtz resonator size and shape.
Figure 4B:
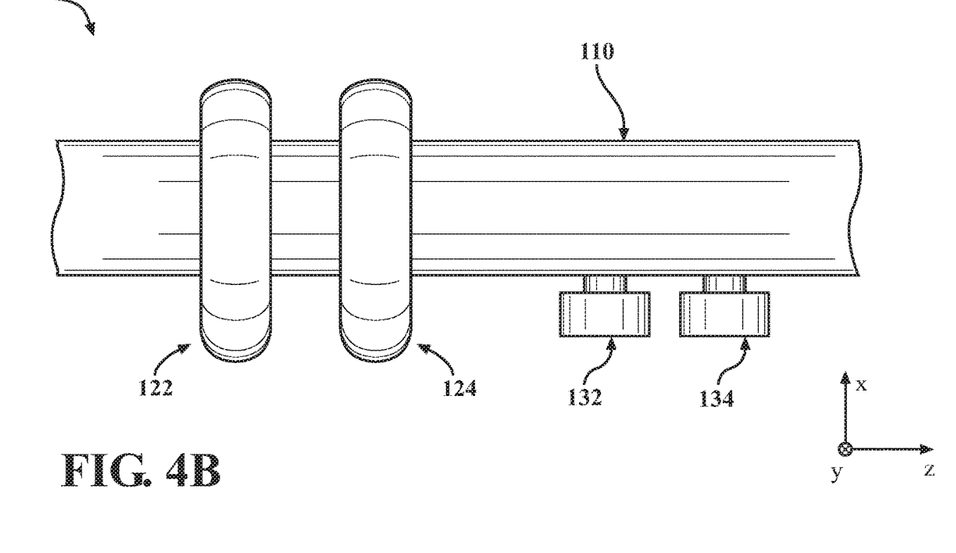
FIG. 4B is a side cross-sectional view of duct of FIG. 4A, viewed along the line 4B-4B.

In some applications, space limitations can limit the extent to which Helmholtz resonators 122, 124, 132, 134 can protrude from a duct 100, 300 as they are, for example, in FIGS. 1C and 3B. In such applications, the Helmholtz resonators 122, 124, 132, 134 can protrude from the duct in different directions to best utilize space. FIG. 4A shows a top plan view of an alternative implementation of a duct having a space-saving wraparound design for the HF resonator pair 120. FIG. 4B shows a side cross-sectional view of the duct 400 viewed along the line 4B-4B of FIG. 4A, while FIG. 4C shows a cross-sectional view as viewed along the line 4C-4C.

Referring again to FIGS. 1B and 3B, it will be noted that the Helmholtz resonators 122, 124, 132, 134 generally extend straight out from the duct 100, 300 in the x-dimension. While such implementations are of course not limited to one dimension of Cartesian space, it is generally the case in such implementations that the resonators 122, 124, 132, 134 have a single longitudinal axis, generally overlapping the neck 136, that is perpendicular to the proximate portion of the at least one side wall 110.

Figure 4C:
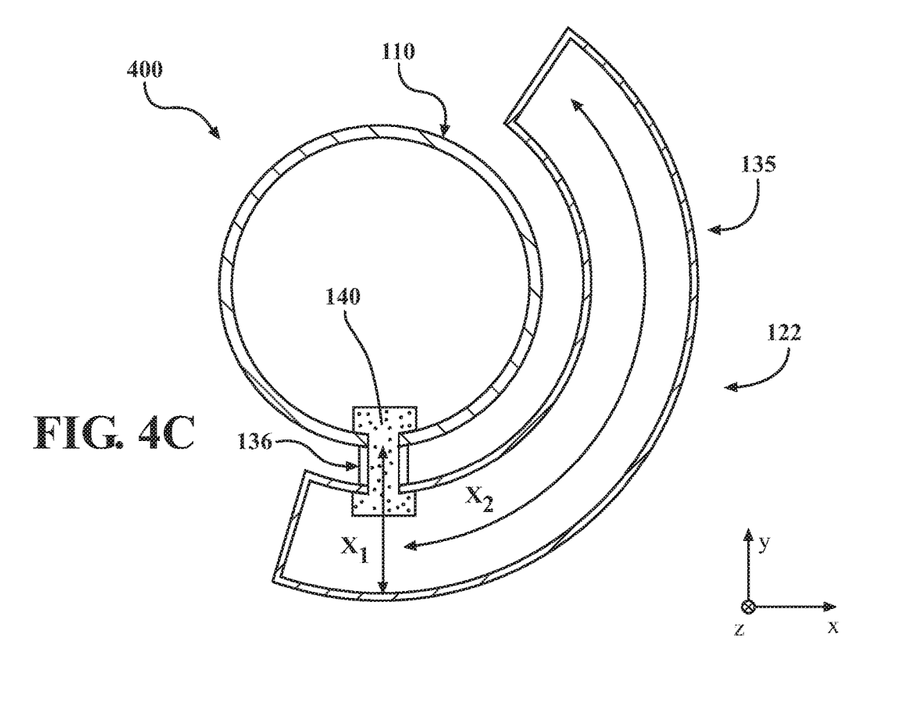
FIG. 4C is cross-sectional view of duct of FIG. 4A, viewed along the line 4C-4C.

In other implementations however, such as that shown in FIGS. 4A-4C, Helmholtz resonators 122, 124, 132, 134 can have multiple longitudinal axes and/or curvilinear longitudinal axes. Referring particularly to FIG. 4C, the high loss, low frequency Helmholtz resonator 122 has a first longitudinal axis, $X_1$, defined substantially by the neck 136. The Helmholtz resonator 122 of FIG. 4C additionally has a second longitudinal axis, $X_2$, defined substantially by the chamber portion 135. The longitudinal axes, $X_1$ and $X_2$ are substantially perpendicular where they cross, such that the resonator 122 broadly forms a right angle at the junction of the neck 136 and chamber 135. This causes the chamber to extend laterally (in the x-dimension of FIG. 4C) rather than extending directly away from the duct 100 in the y-dimension. In addition, the $X_2$ axis is curvilinear, as the chamber portion 135 substantially wraps around the duct 100, thereby further avoiding a large protrusion away from the duct 100. It will be appreciated that many variations of resonator shape, including variations with multiple and/or curvilinear longitudinal axes, can be employed to physically fit a sound absorption unit 115 of the present teachings into a limited space, without requiring effective frequency limitations.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A fluid duct sound absorption system comprising:
  a duct having at least one side wall for directing flow of a fluid and having a longitudinal axis defining upstream and downstream directions; and
  a low frequency (LF) coupled pair of Helmholtz resonators comprising an upstream LF Helmholtz resonator and a downstream LF Helmholtz resonator separated by a first coupling distance, each of the upstream LF Helmholtz resonator and the downstream LF Helmholtz resonator comprising:
    a LF chamber portion bounded by at least one enclosure wall defining a LF chamber volume; and
    a LF neck connecting an aperture in the at least one enclosure wall to an aperture in the at least one side wall and thereby placing the LF chamber portion in fluid communication with the duct; and
  a high frequency (HF) coupled pair of Helmholtz resonators positioned downstream from the LF coupled pair of Helmholtz resonators, and comprising an upstream HF Helmholtz resonator and a downstream HF Helmholtz resonator separated by a second coupling distance, each of the upstream HF Helmholtz resonator and the downstream HF Helmholtz resonator comprising:
    a HF chamber portion bounded by at least one enclosure wall defining a HF chamber volume; and
    a HF neck connecting an aperture in the at least one enclosure wall to an aperture in the at least one side wall and thereby placing the HF chamber portion in fluid communication with the duct,
  the LF neck of the upstream LF Helmholtz resonator and the HF neck of the upstream HF Helmholtz resonator being covered and at least partially filled with an acoustically absorbing medium.

2. The fluid duct sound absorption system as recited in claim 1, wherein the first coupling distance is defined by an equation $$s_1 \cong 0.2\left(\frac{c}{f_L}\right)$$

wherein $s_1$ is the first coupling distance, c, is the speed of sound in the fluid; and $f_L$ is a resonance frequency of each of the upstream LF Helmholtz resonator and the downstream LF Helmholtz resonator.

3. The fluid duct sound absorption system as recited in claim 1, wherein the second coupling distance is defined by an equation $$s_2 \cong 0.2\left(\frac{c}{f_H}\right)$$

wherein $s_2$ is the second coupling distance, c, is the speed of sound in the fluid; and $f_H$ is a resonance frequency of each of the upstream HF Helmholtz resonator and the downstream HF Helmholtz resonator.

4. The fluid duct sound absorption system as recited in claim 1, wherein duct defines a distance, D, between an aperture in the at least one side wall at which a neck connects, and an opposing point in the at least one side wall, according to an equation:

$$D < 0.5 \frac{c}{f_H}$$

wherein c is the speed of sound in the fluid and $f_H$ is a resonance frequency of each of the upstream HF Helmholtz resonator and the downstream HF Helmholtz resonator.

5. The fluid duct sound absorption system as recited in claim 1, wherein the duct has at least two LF coupled pairs of Helmholtz resonators positioned in parallel with one another, and at least two HF coupled pairs of Helmholtz resonators positioned in parallel with one another.

6. The fluid duct sound absorption system as recited in claim 1, wherein the upstream LF Helmholtz resonator and the downstream LF Helmholtz resonator each has a first longitudinal axis and a second longitudinal axis forming a nonlinear angle with the first longitudinal axis, such that the LF chamber portion protrudes from the at least one side wall at the nonlinear angle.

7. The fluid duct sound absorption system as recited in claim 6, wherein the second longitudinal axis is curvilinear, such that the upstream LF Helmholtz resonator and the downstream LF Helmholtz resonator at least partially wrap around the duct.

8. The fluid duct sound absorption system as recited in claim 1, comprising an interpair distance of separation, d, measured from midpoints of the LF and HF coupled Helmholtz resonator pairs, according to an equation:

$$d > \frac{(s_1 + s_2 + w_1 + w_2)}{2}$$

wherein $s_1$ and $s_2$ are the first and second coupling distances; $w_1$ is a width of the LF chamber portion of a LF Helmholtz resonator; and $w_2$ is a width of the HF chamber portion of a HF Helmholtz resonator.

9. A fluid duct sound absorption system comprising:
a duct having at least one side wall for directing flow of a fluid and having a longitudinal axis defining upstream and downstream directions; and
a low frequency (LF) coupled pair of Helmholtz resonators comprising an upstream LF Helmholtz resonator and a downstream LF Helmholtz resonator positioned on the duct and separated by a first coupling distance, each of the upstream LF Helmholtz resonator and the downstream LF Helmholtz resonator having a first resonance frequency;
a high frequency (HF) coupled pair of Helmholtz resonators positioned downstream from the LF coupled pair of Helmholtz resonators comprising an upstream HF Helmholtz resonator and a downstream HF Helmholtz resonator positioned on the duct and separated by a second coupling distance, each of the upstream HF Helmholtz resonator and the downstream HF Helmholtz resonator having a second resonance frequency that is greater than the first resonance frequency; and
an internal sound reflector formed of a planar acoustically reflective material positioned inside the duct to reflect sound waves emanating from any of the Helmholtz resonators back to the same Helmholtz resonator,
the upstream LF Helmholtz resonator and the upstream HF Helmholtz resonator being covered and at least partially filled with an acoustically absorbing medium.

10. The fluid duct sound absorption system as recited in claim 9, wherein the first coupling distance is defined by an equation $$s_1 \cong 0.2\left(\frac{c}{f_L}\right)$$

wherein $s_1$ is the first coupling distance, c, is the speed of sound in the fluid; and $f_L$ is the first resonance frequency.

11. The fluid duct sound absorption system as recited in claim 9, wherein the second coupling distance is defined by an equation $$s_2 \cong 0.2\left(\frac{c}{f_H}\right)$$

wherein $s_2$ is the second coupling distance, c, is the speed of sound in the fluid; and $f_H$ is the second resonance frequency.

12. The fluid duct sound absorption system as recited in claim 9, wherein duct defines a distance, D, between an aperture in the at least one side wall at which a neck connects, and an opposing point in the at least one side wall, according to an equation:

$$D \geq 0.5 \frac{c}{f_H}$$

wherein c is the speed of sound in the fluid and $f_H$ is a resonance frequency of each of the upstream HF Helmholtz resonator and the downstream HF Helmholtz resonator.

13. The fluid duct sound absorption system as recited in claim 9, wherein the upstream HF Helmholtz resonator and the downstream HF Helmholtz resonator have identical dimensions relative to one another; and the upstream LF Helmholtz resonator and the downstream LF Helmholtz resonator have identical dimensions relative to one another.

14. The fluid duct sound absorption system as recited in claim 9, comprising:
two identical coupled pairs of LF Helmholtz resonators positioned opposite one another on the at least one side wall; and
two identical coupled pairs of HF Helmholtz resonators positioned opposite one another on the at least one side wall.

15. An air duct for a motor vehicle, the air duct comprising:
a duct having at least one side wall for directing air flow and having a longitudinal axis defining upstream and downstream directions; and
a low frequency (LF) coupled pair of Helmholtz resonators comprising an upstream LF Helmholtz resonator and a downstream LF Helmholtz resonator separated by a first coupling distance, each of the upstream LF Helmholtz resonator and the downstream LF Helmholtz resonator comprising:
a LF chamber portion bounded by at least one enclosure wall defining a LF chamber volume; and
a LF neck connecting an aperture in the at least one enclosure wall to an aperture in the at least one side wall and thereby placing the LF chamber portion in fluid communication with the duct; and
a high frequency (HF) coupled pair of Helmholtz resonators positioned downstream from the LF coupled pair of Helmholtz resonators, and comprising an upstream HF Helmholtz resonator and a downstream HF Helmholtz resonator separated by a second coupling distance, each of the upstream HF Helmholtz resonator and the downstream HF Helmholtz resonator comprising:
a HF chamber portion bounded by at least one enclosure wall defining a HF chamber volume; and
a HF neck connecting an aperture in the at least one enclosure wall to an aperture in the at least one side wall and thereby placing the HF chamber portion in fluid communication with the fluid duct,
the LF neck of the upstream LF Helmholtz resonator and the HF neck of the upstream HF Helmholtz resonator being covered and at least partially filled with an acoustically absorbing medium.

16. The air duct as recited in claim 15, wherein the first coupling distance is defined by an equation $$s_1 \cong 0.2\left(\frac{c}{f_L}\right)$$

wherein $s_1$ is the first coupling distance, c, is the speed of sound in air; and $f_L$ is a resonance frequency of each of the upstream LF Helmholtz resonator and the downstream LF Helmholtz resonator.

17. The air duct as recited in claim 15, wherein the second coupling distance is defined by an equation $$s_2 \cong 0.2\left(\frac{c}{f_H}\right)$$

wherein $s_2$ is the second coupling distance, c, is the speed of sound in air; and $f_H$ is a resonance frequency of each of the upstream HF Helmholtz resonator and the downstream HF Helmholtz resonator.

18. The air duct as recited in claim 15, wherein duct defines a distance, D, between an aperture in the at least one side wall at which a neck connects, and an opposing point in the at least one side wall, according to an equation:

$$D < 0.5 \frac{c}{f_H}$$

wherein c is the speed of sound in air and $f_H$ is a resonance frequency of each of the upstream HF Helmholtz resonator and the downstream HF Helmholtz resonator.

19. The air duct as recited in claim 15, comprising an interpair distance of separation, d, measured from midpoints of the LF and HF coupled Helmholtz resonator pairs, according to an equation:

$$d > \frac{(s_1 + s_2 + w_1 + w_2)}{2}$$

wherein $s_1$ and $s_2$ are the first and second coupling distances; $w_1$ is a width of the LF chamber portion of a LF Helmholtz resonator; and $w_2$ is a width of the HF chamber portion of a HF Helmholtz resonator.

* * * * *